T. M. MALLON.
PACKING FOR PISTON RODS OR OTHER FLUID ENGINES.
APPLICATION FILED MAR. 23, 1917.

1,303,490.

Patented May 13, 1919.

Inventor
Thomas M. Mallon
By his Attorney

UNITED STATES PATENT OFFICE.

THOMAS M. MALLON, OF PHILADELPHIA, PENNSYLVANIA, ASSIGNOR OF ONE-HALF TO EDWARD A. MALLON, OF BROOKLYN, NEW YORK.

PACKING FOR PISTON-RODS OR OTHER FLUID-ENGINES.

1,303,490.  Specification of Letters Patent.  Patented May 13, 1919.

Application filed March 23, 1917. Serial No. 156,815.

*To all whom it may concern:*

Be it known that I, THOMAS M. MALLON, a citizen of the United States of America, residing at Philadelphia, in the county of Philadelphia and State of Pennsylvania, have invented certain new and useful Improvements in Packings for Piston-Rods or other Fluid-Engines, of which the following is a specification.

My invention relates to a new and useful improvement in packing for piston rods or other fluid engines and has, as one of its principal objects, to provide an exceedingly simple and effective construction, whereby leakage of the fluid will be absolutely prevented and wear of the part readily compensated.

Another object of this invention is to provide a packing which can be readily removed from around the piston rod or shaft.

With these and other objects in view, my invention substantially consists in providing a packing holder or container made to fit in the stuffing box now used, and in which are arranged a number of sectional wooden rings forming the packing proper and which by springs are tightened around the piston rod. The arrangement of the rings and springs is such that when during the pressure stroke some fluid enters into the container, it will act on the packing so as to still more tighten the same around the piston rod.

Figure 1:
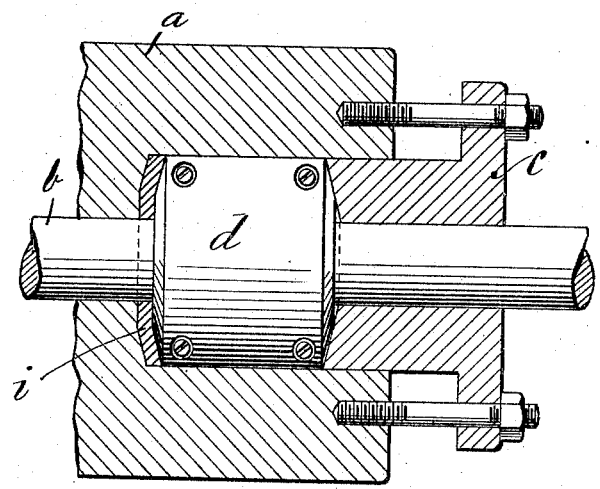
Figure 2:
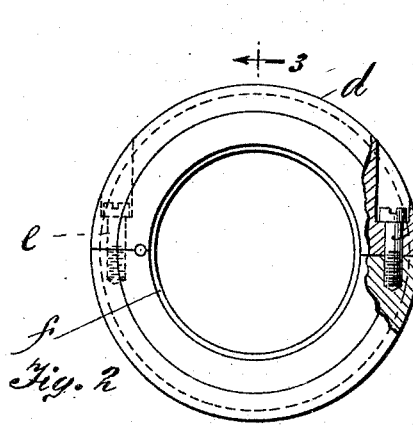
Figure 3:
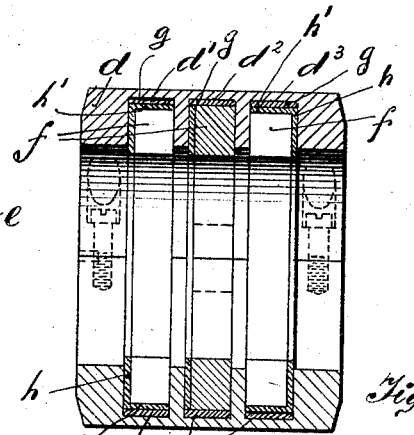
Figure 4:
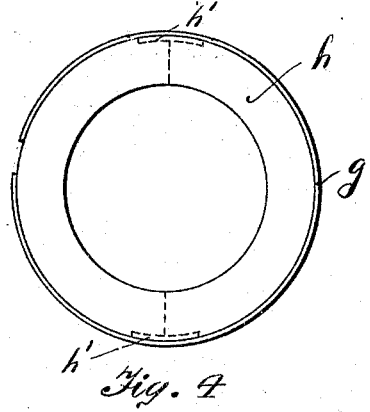
Figure 5:
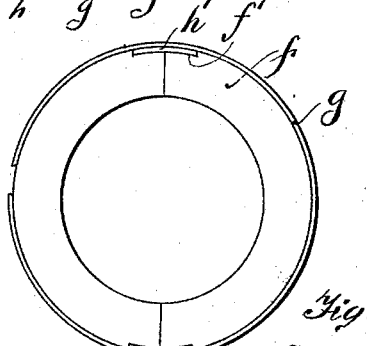

In the accompanying drawing, in which similar reference characters denote corresponding parts, one embodiment of my invention is illustrated, Figure 1 being a longitudinal section of the stuffing box of a cylinder showing my packing container fixed in position therein; Fig. 2 an enlarged end view of the packing container; Fig. 3 a longitudinal section of the container on line 3—3 of Fig. 2; Fig. 4 an end view of one of the sectional packing rings and Fig. 5 a view of the opposite end of said ring.

Referring more specifically to the drawing *a* denotes the stuffing box of a cylinder, *b* the piston rod, *c* the gland. My new packing comprises a packing holder or container made in form of a sleeve *d* composed of two sections adapted to be removably joined together by screws *e*. This sleeve is adapted to snugly fit in the stuffing box and its inner diameter is slightly larger than the diameter of the piston rod.

The container *d* is formed on its inner surface with a number of grooves $d'$, $d^2$, $d^3$ . . . The packing in each compartment consists of a ring *f* split in two halves. As material for the rings I prefer to use wood having lubricating properties, such as lignum vitæ, because I found that such material has a beneficial effect on the piston rod or shaft and maintains the latter in good condition. It also has the advantage that the packing will readily adjust itself to the surface of the piston rod and establish a perfectly tight fit thereon. The inner diameter of each ring when in normal state is slightly smaller than the diameter of the piston rod or shaft, so that when the shaft or rod extends through the container, the rings will be somewhat expanded, but tightened against the surface of the rod or shaft by springs. These springs are made in the form of split rings *g* substantially of the width of the packing rings and adapted to surround and compress the two sections so as to cause them to tightly fit around the piston rod. In order to close or seal the open joints between the two sections of a packing ring I provide rings or plates *h* of lead or other suitable pliable material which are formed with flaps $h'$ projecting from diametrically opposite sides therof. These rings *h* are placed flat against one side of the packing rings and their flaps bent down to extend over and through circumferential grooves $f'$ made at the adjoining ends of the two sections. These flaps are adapted to be pressed tightly over the joints by the spring rings *g*. The compartments $d'$, $d^2$, $d^3$ in their width are so admeasured that the packing rings *f* with their gaskets or lead rings *h* will fit tightly therein.

Owing to this construction it will be seen that when during a pressure stroke steam or the other working medium used leaks through into the container, it will on entering the compartments, $d'$, $d^2$, $d^3$ . . . act on the springs *g* thereby assisting the latter in tightening the packing rings against the surface of the piston rod or shaft.

Between the rear end of the container and the inner end of the stuffing box a lead gasket *i* is provided, which on tightening the gland *c* will seal the crevices formed therebetween.

Various modifications may of course be made in the construction without departing from the principle of my invention and I therefore, do not wish to restrict myself to the details shown and described.

What I claim and desire to secure by Letters Patent is:

1. The combination with a stuffing box and piston rod or shaft, of a packing comprising a packing container arranged in said stuffing box around said piston rod, said packing container being in form of a sleeve composed of two sections adapted to be removably joined together and when so joined to snugly fit in said stuffing box, the inner surface of said container being slightly larger in diameter than that of the said piston rod and being formed with a number of parallel annular grooves, a ring split in two halves in each groove, a spring encircling each of said packing rings and adapted to tightly close the latter around said piston rod and rings each formed with diametrically opposite flaps, one of said rings for each packing ring adapted to flatly bear against one side of the said packing ring and with its flaps to close the crevices of the adjoining ends of the two sections of said packing ring.

2. The combination with a stuffing box and piston rod or shaft, of a packing comprising a packing container in said stuffing box around said piston rod and consisting of a sleeve made of two sections removably joined together and adapted when so joined to snugly fit in said stuffing box, the inner surface of said sleeve being in diameter slightly larger than that of the said piston rod and being formed with a number of annular grooves, a packing ring split in two halves in each groove, the inner diameter of said packing ring being slightly smaller than the diameter of said piston ring, a spring ring encircling the sections of said packing ring and adapted to tightly close the latter around the said piston rod, and for each packing ring an auxiliary ring formed with diametrically opposite flaps and adapted to bear flatly against one side of the packing ring and with its flaps to close the crevices of the adjoining ends of the two sections of the said packing rings.

3. The combination with a stuffing box and piston rod or shaft, of a packing comprising a packing container in said stuffing box mounted around said piston rod and made in form of a sleeve composed of two removable sections, the inner surface of the said sleeve having a number of parallel annular grooves, a packing ring in each of said grooves made in two sections and having circumferential grooves at the adjoining ends of said ring sections, a spring encircling the said two sections of each packing ring and adapted to tightly close the same around the said piston rod and a ring formed with diametrically opposite flaps and adapted to bear against one side of each packing ring and with its flaps to engage the said circumferential grooves and to close the crevices between the adjoining ends of the two sections of the said packing ring.

In testimony whereof I affix my signature in presence of two witnesses.

THOMAS M. MALLON.

Witnesses:
EDW. J. WARDLE,
JOHN W. KINGSMILL.

Copies of this patent may be obtained for five cents each, by addressing the "Commissioner of Patents, Washington, D. C."